(12) United States Patent
Wax et al.

(10) Patent No.: US 6,466,565 B1
(45) Date of Patent: Oct. 15, 2002

(54) MEASUREMENT OF SPATIAL SIGNATURE INFORMATION IN CDMA WIRELESS COMMUNICATION SYSTEMS

(75) Inventors: Mati Wax, San Ramon; Abraham Bar, Palo Alto; Oliver Hilsenrath, Alamo, all of CA (US)

(73) Assignees: Trafficmaster USA, Inc., Garden Grove, CA (US); Motorola, Inc., Schaumburg, IL (US)

( * ) Notice: Subject to any disclaimer, the term of this patent is extended or adjusted under 35 U.S.C. 154(b) by 0 days.

(21) Appl. No.: 09/231,256

(22) Filed: Jan. 15, 1999

Related U.S. Application Data

(63) Continuation-in-part of application No. 08/966,466, filed on Nov. 7, 1997, which is a continuation-in-part of application No. 08/780,565, filed on Jan. 8, 1997.

(51) Int. Cl.[7] .............................................. H04B 7/216
(52) U.S. Cl. ........................ 370/342; 370/335; 370/342; 375/140; 455/456; 455/562
(58) Field of Search ................................. 370/335, 342, 370/441, 334; 375/130, 140; 455/561, 562, 456

(56) References Cited

U.S. PATENT DOCUMENTS 5,608,722 A * 3/1997 Miller ........................ 370/320
5,828,658 A * 10/1998 Ottersten et al. ........... 370/310.1
6,122,260 A * 9/2000 Liu et al. .................... 370/280
6,249,680 B1 * 6/2001 Wax et al. ................... 455/456
6,252,867 B1 * 6/2001 Pfeil et al. ................... 370/335
6,259,724 B1 * 7/2001 Esmailzadeh ............... 375/143

* cited by examiner

Primary Examiner—Edward F. Urban
Assistant Examiner—Temica M. Davis
(74) Attorney, Agent, or Firm—Townsend and Townsend and Crew LLP

(57) ABSTRACT

A CDMA receiver for measuring spatial signal information corresponding to several user transmitters comprises a bank of coherent receivers coupled to an antenna array, a bank of signal buffers for recording samples of the received signal data, and a bank of I/Q despreaders for despreading selected signal samples. The receiver also comprises a buffer control circuit for selecting active power control groups in the recorded signal samples for despreading, and a despreader control circuit for selecting PN despreading sequences required to despread the selected power groups. Selected data samples from the signal buffers are fed into the despreaders. The output of the despreaders is a set of spatially correlated I/Q data streams divided into temporal frames, where each frame contains active power control groups from different user transmitters.

8 Claims, 2 Drawing Sheets

MEASUREMENT OF SPATIAL SIGNATURE INFORMATION IN CDMA WIRELESS COMMUNICATION SYSTEMS

This application is a continuation-in-part of U.S. patent application Ser. No. 08/966,466 filed Nov. 7, 1997, which is a continuation-in-part of U.S. patent application Ser. No. 08/780,565 filed Jan. 8, 1997, both of which are incorporated herein by reference.

FIELD OF THE INVENTION

This invention relates generally to wireless CDMA communication systems. More particularly, it relates to techniques for inexpensively and efficiently extracting coherent spatial signal information corresponding to multiple user transmitters in a CDMA cellular telephone network.

BACKGROUND OF THE INVENTION

For various purposes it is sometimes considered useful and/or necessary in radio communications to obtain spatial signal information, i.e. to use an antenna array to coherently receive signals originating from a remote transmitter. Because the signals received at the antenna array retain relative phase information, the signals contain useful spatial information. For example, beamforming techniques are based on the use of coherent spatial signal information to reduce interference and increase system capacity. In another example, Hilsenrath et al. in U.S. patent application Ser. No. 08/780,565 (which is not admitted to be prior art by its mention in this background discussion) disclose a unique method for location finding that is based on the measurement of spatial signal information. Because the spatial signal information is highly correlated with location, this technique performs especially well in multipath environments, and requires only a single base station.

Because code division multiple access (CDMA) systems are becoming more widespread, there is a particular need for measuring spatial signal information in wireless communication systems based on CDMA. As is well known, CDMA is a spread spectrum wireless digital communication technique that enjoys some reduction in the effects of multipath. In contrast to earlier FDMA techniques that assign users to narrow frequency channels in the band, CDMA does not limit individual users to narrow frequency channels but spreads them all throughout the frequency spectrum of the entire band. Signals sharing the band are distinguished by assigning them different pseudonoise (PN) digital code sequences. The well-known correlation receiver uses this known signal structure to decompose multipath parts, provided they are separated in time by at least one chip. The different parts can then be recombined using a RAKE receiver to improve signal strength.

Although presently existing correlation receivers help reduce the effects of multipath on signal fading, they do not provide any coherent spatial signal information. Measuring spatial signal information in CDMA systems, therefore, requires that existing receivers be redesigned and remanufactured. This very expensive and long-term approach, however, does not address the existing need for providing such spatial signal information.

OBJECTS AND ADVANTAGES OF THE INVENTION

Accordingly, it is a primary object of the present invention to provide a method for extracting coherent spatial signal information using existing CDMA receivers. It is another object of the invention to provide a CDMA receiver that inexpensively and efficiently extracts spatial signal information corresponding to a collection of user transmitters. These and other advantages will become apparent from the following description and accompanying drawings.

SUMMARY OF THE INVENTION

In one aspect of the present invention, a CDMA receiver is provided for measuring spatial signal information corresponding to several user transmitters. The receiver comprises a bank of coherent receivers coupled to an antenna array, a bank of signal buffers for recording samples of the received signal data, and a bank of I/Q despreaders for despreading selected signal samples. The receiver also comprises a buffer control circuit for selecting active power control groups in the recorded signal samples for despreading, and a despreader control circuit for selecting PN despreading sequences required to despread the selected power groups. Selected data samples from the signal buffers are fed into the despreaders. The output of the despreaders is a set of spatially correlated I/Q data streams divided into temporal frames, where each frame contains active power control groups from different user transmitters.

DETAILED DESCRIPTION

Although the following detailed description contains many specifics for the purposes of illustration, anyone of ordinary skill in the art will appreciate that many variations and alterations to the following details are within the scope of the invention. Accordingly, the following preferred embodiment of the invention is set forth without any loss of generality to, and without imposing limitations upon, the claimed invention. For example, the present invention employs various conventional CDMA techniques and protocols. In particular, the preferred embodiment of the present invention may use the IS-95 standard, although those skilled in the art will appreciate that the invention is not limited to any particular CDMA standard.

Figure 1:
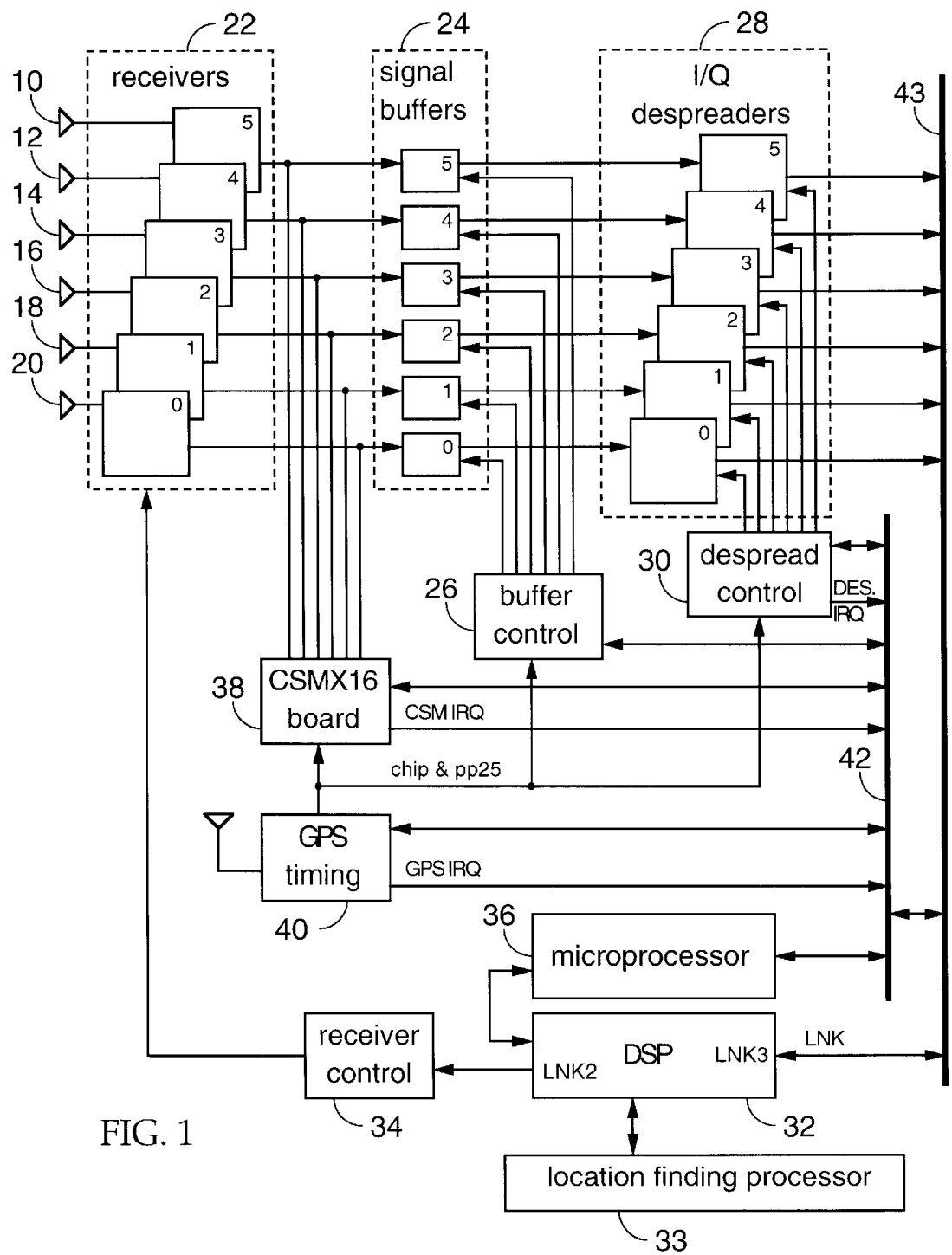
FIG. 1 is a block diagram of a CDMA receiver according to a preferred embodiment of the present invention.

FIG. 1 is a block diagram of a CDMA receiver according to a preferred embodiment of the present invention. A cellular phone (not shown) transmits a signal which travels through an environment and couples to an array of antennas 10, 12, 14, 16, 18, 20. Although there are typically six antennas (two per sector), in general there is a number p of antennas forming the array. Note that more than p antennas may be physically present, and sectoring techniques can be used to dynamically select the p antennas from which signals are received. Typically, in addition to a direct path signal from the phone to the array, there may be additional multipath signals reflected from various environmental objects. These direct and multipath signals contain spatial information that may be measured by coherently receiving the signals using the antenna array.

Figure 2:
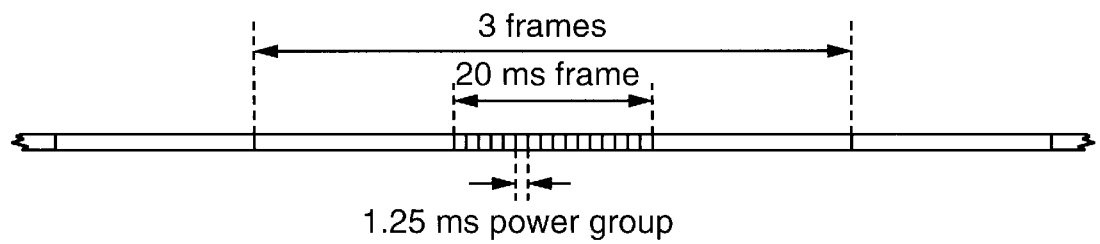
FIG. 2 is a schematic diagram of a data format containing three frames, with power groups indicated in one of the frames.

The signals from each user phone in the coverage area of the base station are coupled to the six antennas and received by a corresponding bank of six receivers 22. These receivers 22 are coherently synchronized so that they preserve the relative phase information between the signals coupled to the six antennas. Each receiver downconverts the signal from one antenna to baseband, and then digitizes the signal to produce I and Q signal components. At this point, the signals from the various user phones have not yet been distinguished. It should be noted at this point, however, that the CDMA signal from each phone has a standard temporal structure, as shown in FIG. 2. The CDMA signal is composed of a sequence of temporal frames, each having a duration of 20 ms and containing 192 bits of information. This frame, in turn, is divided into 16 power control groups, each having a 1.25 ms duration. At high data rates, all 16 power control groups contain information. At the lowest data rate, only two power groups are active, i.e. contain information. At low rates, the placement of the active groups within the frame is pseudorandom. The six digitized signals produced by the receiver bank 22 are sent to a corresponding bank of six signal buffers 24. Each signal buffer stores data samples covering several recently received digitized signal frames. Typically, each buffer is large enough to store three or more frames of data. At periodic intervals of 1.25 ms, a buffer control circuit 26 calculates a buffer address that is used to select a power control group from the signal frames currently in each buffer. The specific buffer address is calculated so that during each power group time interval an active power group is selected from one of up to 16 distinct user phones. The output from each of the six buffers, therefore, is a data stream of selected power groups delayed by approximately three frames, where each of the 16 power group intervals in a frame can contain an active power group from one of up to 16 distinct user signals. Buffer control 26 sends a common set of signals to the buffers in signal buffer bank 24. These signals include buffer record and playback addresses, read/write signals, and buffer configuration data.

The six data streams from the buffer bank 24 are sent for despreading to a bank of six corresponding despreaders 28. In each despreader, the incoming data stream of selected power groups is correlated with appropriate PN sequences in order to despread the data. In a CDMA communication system, all users share a common frequency band, and the different mobile phones are distinguished by their use of distinct PN spreading sequences. Low cross-correlation between the unique PN sequences ensures that there is little interference between different users within the base station service area. In addition, low cross-correlation between distinct delayed versions of a given PN sequence ensures that there is little interference between various multipath parts of a signal originating from a single user. Well-known timing synchronization techniques are used to identify and lock onto the PN sequences of the multipath parts for each user.

In contrast with conventional use, despreaders 28 in the present apparatus have their PN sequences changed every 1.25 ms by a despreader control circuit 30. The PN sequence is changed in synchronization with the transition between power groups so that, during each of the 16 power groups in a frame, the despreader uses the PN sequence corresponding to one of 16 users. The output from each despreader, therefore, is a despreaded I/Q data stream where each of the 16 power group intervals in a frame contains the despreaded signal from one of up to 16 user signals.

It is significant to note that the resulting six signal data streams do not contain all the information transmitted from the mobile phones. Rather, each frame coming out of the despreaders contains up to 16 active power group samples derived from up to 16 different mobile phones. Note that since the despreading essentially separates the multipath parts with differential delays greater than the chip period, it is possible to obtain the spatial signatures of all the significant multipath parts (referred to as fingers) of every mobile. In the present system, up to four fingers per mobile can be despread.

The despreader output is used for determining spatial signal information, as will be described in more detail after the following description of the operation of buffer control circuit 26 and despreader control circuit 30. A common set of signals are sent from despreader control 30 to despreader bank 28. Specifically, these signals include two PN sequences: a combined I despreading sequence and a combined Q despreading sequence. Each of these sequences is a chip-by-chip product of all the spreading signals involved in spreading the signal in the transmitter. In the case of IS-95, these spreading signals include the long code, the Walsh codes, and the short I or Q sequences.

It is important to note that although the Walsh codes are used as the transmitted symbols and thus contain the transmitted signal information, the present technique treats the Walsh code as just another spreading signal. Including the Walsh code as part of the spreading signal provides improvements in processing at the base station receiver in determining the phase of the received signals. In the preferred embodiment, the Walsh code information is obtained by sending the decoded data bits from the CSM board 38 through a convolutional encoder, an interleaver, and a Walsh encoder, just as was done in the mobile prior to transmission. It will be appreciated that other codes or training sequences used by various other standards can be used just as the Walsh codes are used in the IS-95 standard described in this embodiment. It will also be appreciated that the Walsh codes could, in principle, be provided by the CSM board 38 since the decoders determine the Walsh codes in order to produce the data stream. Although presently existing CSM integrated circuits do not provide Walsh code output, such integrated circuits may be produced in the future and could be used in the context of the present invention.

A despread IRQ (DES. IRQ) signal is issued on any power control group timing interval transition and serves to trigger microprocessor 36 to load the next set of despreading parameters into the despread control 30 and buffer control 26. The GPS IRQ is issued on each UTC second boundary and triggers the microprocessor to perform various housekeeping tasks. System bus 42 carries information between system components. For example, data sent over bus 42 includes system reset commands, buffer address information for data playback, PN sequence states for despreading, PN mask information for data despreading, Walsh codes for data despreading, and CSM data and control information.

The six digitized signals produced by the receiver bank 22 are sent to a conventional CDMA modem board 38 which contains 16 conventional CSM integrated circuits which contain searchers, despreaders, fast Hadamard transform (FHT) processors, deinterleavers, decoders, and other well-known circuitry required to produce Walsh symbols and other signal information from the signals received from up to 16 mobile users. Conventional CDMA modem board 38 does not produce spatial signal information. It does, however, provide data transmitted by each one of the users, the rates of transmission for each user, PN sequence information, finger offset information for up to eight paths per user, frame offset information, and power group placement information. This information is made available over data bus 42 to microprocessor 36, which computes buffer addresses that are sent over bus 42 to buffer control circuit 26, and PN sequences that are sent over bus 42 to despreader control circuit 30. The purpose of the three-frame delay of buffers 24 is to allow time for the microprocessor 36 to compute the buffer addresses, PN sequences, and other control parameters. A GPS timing circuit 40 is used to provide precise timing and synchronization information to CDMA modem board 38, buffer control circuit 26, and despreader control circuit 30. The signals sent from GPS timing circuit to receiver board 38, buffer control 26, and despread control 30 include a CHIP×16 clock (1.2288×16 MHz) and a pulse per 2 second signal (even second pulse).

The six output data streams from the despreaders are low-pass filtered and then made available on DSP data bus 43. These samples are then collected by a digital signal processor (DSP) 32. The DSP first performs a frequency estimation that is aimed at nulling the frequency error of the sampled signals. This frequency error is the result of the difference in frequencies between the user transmitter and the base station receiver. Since the frequency error can be up to several hundred Hertz, when the signal is despreaded and downconverted to baseband, it will have a residual nonzero frequency. Therefore, since signal samples in the present system are averaged over relatively long periods of time, the residual frequency must be corrected to prevent the samples from averaging out to zero. The DSP therefore first determines the residual frequency, and then corrects it before averaging the samples.

In the preferred embodiment, a batch of samples from a single finger of a single user signal is collected over a time interval of 1.25 ms every 60 ms. Thus, up to 48 different batches, corresponding to 48 different users, can be sampled in the 60 ms interval. Obviously, more users can be handled by increasing the length of the 60 ms repetition interval. Alternatively, one can also use a non-uniform sampling scheme wherein each mobile is sampled at a period inversely proportional to the speed of its physical movement. Over the course of a few seconds, a collection of about 100 batches are collected for each mobile.

Spatial signal information for each finger is determined from the data by one of several techniques. According to one method, a p×p covariance matrix for each batch is formed from the outer products of the sampled p-component signal vectors in the batch, and the resulting M covariance matrices are averaged to yield an average covariance matrix. This covariance matrix then forms the basis for beamforming, location finding, or other wireless communications techniques based on spatial signal information. In a beamforming application, for example, a receiver control circuit 34 uses the spatial information to control the receiver bank 22 in order to enhance system performance. In a location finding application, a microprocessor 36 uses the spatial signal information to estimate likely locations of the user phones.

To summarize, the specific functions performed by microprocessor 36 include:
1. Initializing and controlling CSMs, GPS timing, buffer control, and despreader control.
2. Reading rates, offsets, active power groups, and transmitted data of subscribers from CSMs.
3. Computing transmitted Walsh codes from the received data.
4. Loading Walsh codes into despreader control before each power control group interval transition.
5. Loading playback address into buffer control before each power control group interval transition.
6. Receiving subscriber data from the DSP for despreading.
7. Sending, for each batch of data sent to the DSP from the despreader, a descriptor to the DSP identifying the subscriber associated with the data.

The specific functions performed by DSP 32 include:
1. Computing a frequency error for each subscriber.
2. Correcting the frequency error for each received data batch.
3. Computing covariance matrices for each data batch.
4. Transferring covariance matrices to the location finding processor 33.
5. Transferring instructions to the microprocessor (e.g., subscriber lists and parameters)

The specific functions performed by receiver control 34 include:
1. Setting the receiver frequency.
2. Setting the receiver attenuation.

Figure 3:
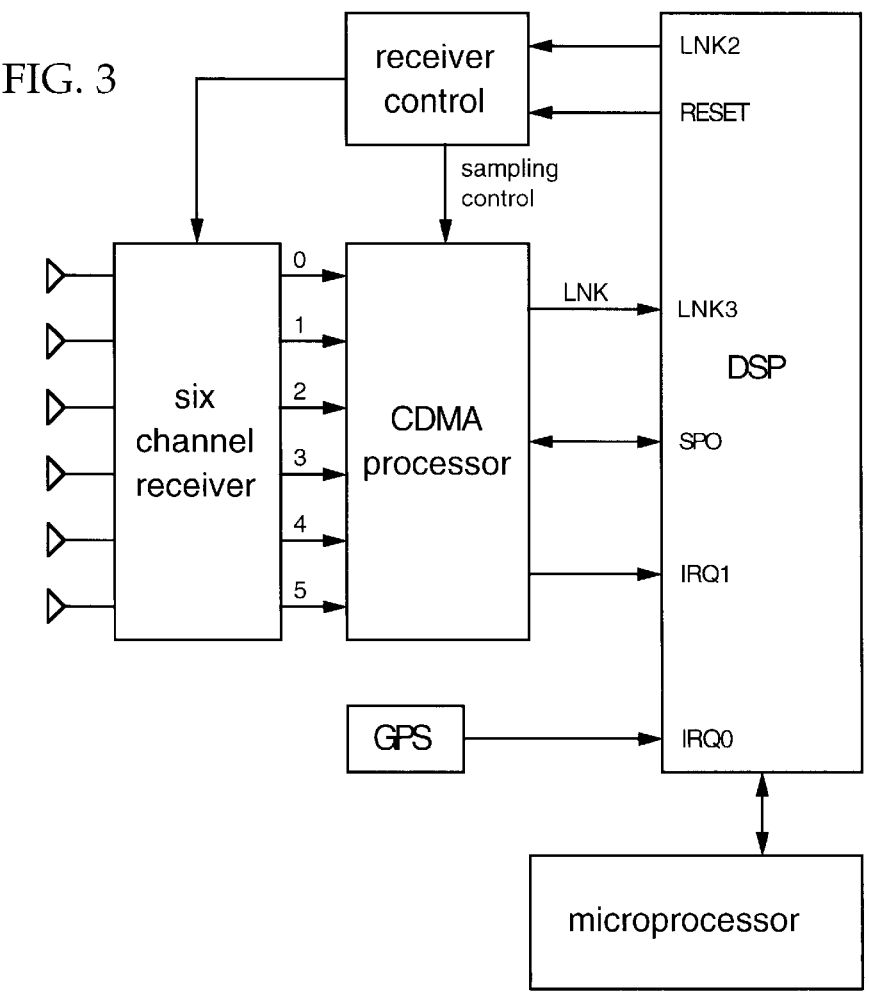
FIG. 3 is a higher-level block diagram of a CDMA receiver according the an embodiment of the present invention.

FIG. 3 is a higher level block diagram of FIG. 1 emphasizing the fact that, in order to compute the spatial signature of a CDMA signal, one must first despread it. To determine the spatial signature, however, it is not necessary to capture or even compute the actual information data stream. For the purposes of the spatial signature measurement technique of the present invention, the important information is the relative phase information between the antennas of the array, and not the information data stream itself. Consequently, the present technique is distinct in motive, method, and result from known CDMA reception techniques. It provides an efficient method and system for simultaneously determining spatial signal information for multiple users in a CDMA communications system. Although this invention has been illustrated by a particular preferred embodiment, it will be appreciated that many details may be altered without departing from the spirit and scope of the invention.

What is claimed is:

1. A CDMA receiver comprising:
   a bank of coherent receivers coupled to an antenna array, wherein the receivers measure signal data from user transmitters;
   a bank of signal buffers coupled to the coherent receivers, wherein the buffers record samples of the received signal data;
   a bank of I/Q despreaders coupled to the signal buffers, wherein the despreaders despread selected signal samples recorded in the signal buffers and produce a set of spatially correlated I/Q data streams divided into temporal frames, wherein each frame contains active power control groups from different user transmitters;
   a buffer control circuit coupled to the signal buffers, wherein the buffer control circuit selects the selected signal samples recorded in the signal buffers; and
   a despreader control circuit coupled to the I/Q despreaders, wherein the despreader control circuit selects despreading sequences corresponding to the different user transmitters.

2. The receiver of claim 1 further comprising a microprocessor coupled to the despreader control circuit, wherein the microprocessor computes Walsh codes from transmitter signal information data.

3. The receiver of claim 1 wherein the despreading sequences comprise Walsh codes derived from transmitter signal information data.

4. The receiver of claim 1 further comprising a processor coupled to the I/Q despreaders, wherein the processor computes spatial signatures from the spatially correlated I/Q data streams.

5. The receiver of claim 1 further comprising a processor coupled to the I/Q despreaders, wherein the processor estimates a frequency of the I/Q data streams and corrects a residual frequency error of the I/Q data streams.

6. A method for determining spatial signal information of user transmitters in a CDMA communications system, the method comprising:

coherently receiving at an antenna array signal data from the user transmitters;

recording samples of the received signal data in signal buffers;

selecting selected signal samples recorded in the signal buffers;

selecting despreading sequences corresponding to the different user transmitters;

despreading the selected signal samples using the selected despreading sequences to produce a set of spatially correlated I/Q data streams divided into temporal frames, wherein each frame contains active power control groups from different user transmitters;

estimating a frequency of the I/Q data streams and correcting a residual frequency error of the I/Q data streams; and computing spatial signatures from the spatially correlated I/Q data streams.

7. The method of claim 6 further comprising computing Walsh codes from transmitter signal information data.

8. The method of claim 6 wherein selecting the despreading sequences comprises selecting Walsh codes.

* * * * *